United States Patent Office 3,275,626
Patented Sept. 27, 1966

3,275,626
PENICILLIN CONVERSION VIA SULFOXIDE
Robert B. Morin and Billy G. Jackson, Indianapolis, Ind., assignors to Eli Lilly and Company, Indianapolis, Ind., a corporation of Indiana
No Drawing. Filed July 31, 1962, Ser. No. 213,588
8 Claims. (Cl. 260—243)

The present invention relates to antibiotic substances. More particularly it relates to certain penicillin-derived antibiotic substances and to novel methods for their production.

The first of the antibiotics to be discovered were the penicillins, which contain the penam nucleus, a thiazolidine ring with a fused β-lactam. A more recent discovery is the cephalosporins, which contain the Δ³-cephem nucleus, a dihydrothiazine ring with a fused β-lactam. These two classes of antibiotics are thus somewhat related in structure, as will be seen from the following general structural formulas:

$$R-CO-NH-CH-CH\diagdown S\diagup C(CH_3)_2$$
$$O=C-N-CH-COOM$$
Penicillins $$R-CO-NH-CH-CH\diagdown S\diagup CH_2$$
$$O=C-N-C(CH_2-O-Ac)$$
$$COOM$$
Cephalosporins wherein R represents essentially any organic radical, as exemplified by hundreds of examples in the prior art, and M represents a pharmaceutically acceptable cation. The penam nomenclature for the penicillins is described by Sheehan, Henery-Logan, and Johnson in the J. Am. Chem. Soc., 75, 3293, footnote 2 (1953), and has been adapted to the cephalosporins by Morin, Jackson, Flynn, and Roeske in the J. Am. Chem. Soc., 84, 3400 (1962). In accordance with these systems of nomenclature, "penam" and "cepham" refer respectively to the following saturated ring structures:

Penam      Cepham while "penem" and "cephem" refer to the same ring structure with a double bond, the position of which is indicated by a prefixed "Δ" with superscript denoting the carbon atom of lowest number to which the double bond is connected.

While the penicillins have been remarkably successful in the treatment of a variety of infections, and the cephalosporins have shown considerable promise in this direction, there is a continuing need for different and improved antibiotics. There has also been a need for a simple and economical method for synthesizing the cephalosporin compounds from available starting materials.

One object of the present invention is to prepare novel antibiotic substances.

Another object is to prepare compounds of the cephalosporin series in an improved manner.

Another object is to prepare modified penicillins and cephalosporins.

Other objects of the invention and its advantages over the prior art will be apparent from the following description, operating examples, and claims.

In one aspect, the present invention affords a novel class of compounds having the following structure:

$$R-CO-NH-CH-CH\diagdown S\diagup$$
$$O=C-N-R^1 \qquad (I)$$

where R is an organic radical and $R^1$ has a structure represented by one of the following formulas:

(I-A), (I-B), (I-C), (I-D), (I-E), (I-F), (I-G), (I-H)

where $R^2$, when linked directly to the molecule, is

—$NH_2$,
—N—($C_1$–$C_4$ alkyl), or
—N=di($C_1$–$C_4$ alkyl);

where $R^2$, when linked to the molecule through —O—, is hydrogen
a pharmaceutically acceptable cation,
$C_1$–$C_4$ alkyl,
$C_4$–$C_7$ cycloalkyl,
phenyl, or
substituted phenyl;

and where Y is $C_2$–$C_4$ acyloxy or
$C_1$–$C_4$ alkoxy.

In the above formulas, $R^2$, when linked directly to the molecule to form amides, may be exemplified by $CH_3NH-$, $C_2H_5NH-$, $C_4H_9NH-$, $(CH_3)_2N-$, $(C_2H_5)_2N-$ and $CH_3(C_2H_5)N-$. When linked to the molecule through an oxygen atom to form carboxylic acids, salts, and esters, $R^2$ may be exemplified by hydrogen; sodium, potassium, and ammonium; methyl, ethyl, n-propyl, isopropyl, n-butyl, sec.-butyl, isobutyl, and tert.-butyl; cyclobutyl, cyclopentyl, cyclohexyl, and cycloheptyl; phenyl; and chlorophenyl, bromophenyl, trichloromethylphenyl, nitrophenyl, methoxyphenyl, tolyl, and the like, the substituents being in the o-, m-, or p-position, and further substitution with these and other substituents being permitted.

Y may be exemplified by acetoxy, propionoxy, butyroxy, benzoxy, methoxy, ethoxy, propoxy, butoxy, and the like.

Thus, among the compounds of the invention are penam compounds having the following structure:

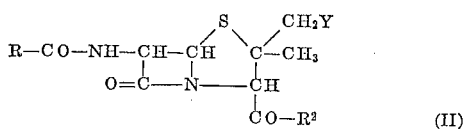

(II)

wherein R, $R^2$, and Y are as defined above.

Also included are cephem compounds of the following structure:

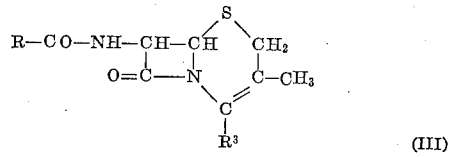

(III)

and the dihydro derivatives and $\Delta^2$ analogues thereof, wherein $R^3$ is hydrogen or $-CO-R^2$, and R and $R^2$ are as defined above.

Also included are cepham compounds of the following structure:

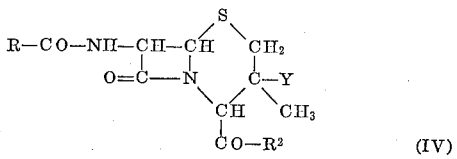

(IV)

wherein R, $R^2$, and Y are as defined above.

Illustrative examples of the products of the present invention include the following, but it is to be understood that the invention is not limited thereto:

2-acetoxymethyl-2-methyl-6-phenylacetamidopenam-3-carboxylic acid
3-propionoxy-3-methyl-7-phenylmercaptoacetamido-cepham-4-carboxylic acid sodium salt
3-methyl-7-(2-furyl)acetamido-$\Delta^3$-cephem-4-carboxylic acid methyl ester
3-methyl-7-(3-furyl)acetamido-$\Delta^2$-cephem-4-carboxylic acid amide
3-methyl-7-butylmercaptoacetamidocepham-4-carboxylic acid butyl ester
3-methyl-7-(2-thienyl)acetamido-$\Delta^3$-cephem
3-methyl-7-enanthamido-$\Delta^2$-cephem
3-methyl-7-$\alpha$-phenylpropionamidocepham In other aspects, the invention provides methods whereby the novel compositions can be obtained.

In a preliminary step, penicillin nucleus (6-aminopenicillanic acid) or a penicillin having a 6-acylamido substituent group as desired is subjected to treatment with an oxidizing agent according to the method of the prior art, as described for example by Chow, Hall, and Hoover, J. Org. Chem., 27, 1381 (1962), to produce the corresponding sulfoxide:

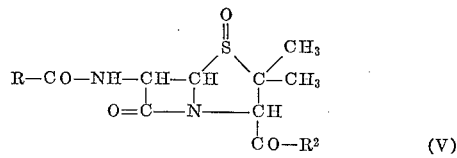

(V)

For this purpose, the penicillin compound is commingled with a substance affording active oxygen, such as metaperiodic acid, peracetic acid, or other organic per-acid or a salt thereof, hydrogen peroxide, iodosobenzene, or the like, in a proportion sufficient to supply around one atom of active oxygen per atom of thiazolidine sulfur. The penicillin can be used in the form of the free acid, but preferably as a salt, ester, or amide thereof, suitably dissolved in a solvent which is inert under the reaction conditions to be employed. Aqueous organic solvents of satisfactory type are available for all of the forms of penicillin. For many of the salts, water can satisfactorily be employed. The oxidizing agent is added at room temperature or somewhat below, preferably with cooling to avoid any substantial temperature rise, which might lead to overoxidation. The reaction is conveniently followed by checking the reaction mixture with starch-iodide paper to detect the presence of active oxygen, and the reaction is terminated when all of the added active oxygen has been used up. The sulfoxide obtained thereby is readily recovered in a known manner, suitably by evaporation of the solvent and recrystallization, or by precipitation at low pH from aqueous reaction mixtures. Recrystallization is conveniently effected from aqueous methanol (1:2).

The penicillin sulfoxide obtained thereby is readily converted in accordance with the present invention by heating to elevated temperature in the presence of an acidic substance. Examples of suitable acids are sulfuric acid, phosphoric acid, and other mineral acids; p-toluenesulfonic acid, benzenesulfonic acid, naphthalenesulfonic acids, and other sulfonic acids; boron trifluoride, aluminum chloride, and other Lewis acids; acetic anhydride, propionic anhydride, benzoic anhydride, and other acid anhydrides; nitrosating agents such as nitrosyl chloride; and other acidic reagents such as the acyl chlorides, phosgene, thionyl chloride, cyanogen bromide, alkyl halides, and the like. Simple pyrolysis tends to bring about the desired rearrangement, but much less rapidly and with lower yield.

The acid substance can be employed in catalytic proportions, of the order of 1 to 10 percent by weight of the penicillin sulfoxide, where the acid substance does not supply an element of the desired product. The catalytic reaction is thus feasible in the production of the compounds of the invention which do not include the radical Y. When the desired product does include the radical Y, the acid substance must afford the radical in equimolar proportion to the penicillin sulfoxide.

No solvent or other liquid medium is necessary for the reaction, but is desirable in order to facilitate heat transfer and to moderate the reaction. Any organic liquid can be used as the reaction medium so long as it is substantially inert to the other reactants under the conditions employed. A preferred solvent and acid reactant combined is acetic anhydride. The reaction temperature should lie in the range of about 100 to about 175° C., preferably about 125 to about 150° C. The conversion is generally found to reach a substantial level after as little as 5 minutes, and is ordinarily complete in less than one hour. The reaction time should be kept as short as possible in order to minimize the formation of undesirable by-products.

After completion of the reaction, the reaction mixture is cooled, and the solvent, if any, is stripped off at reduced pressure. The residue obtained thereby is separated into its components by any convenient method, such as chromatography over silica gel or the like, employing a ketonic solvent for the elution. Other adsorbent solids may be employed as desired, such as silica-alumina, cellulose, Florisil, or the like. For the solvent, methyl isobutyl ketone, methyl ethyl ketone, or acetone can be employed, diluted to some extent with a nonpolar solvent such as hexane, cyclohexane, or benzene, and preferably containing at least some proportion of water, up to the saturation level. The crude substance is first dissolved in an organic solvent such as the eluting solvent to be used thereafter, which solution is applied to the chromatographic column. Elution is then carried out, the eluate fractions being checked by thin-layer chromatography to identify the products in the successive fractions. The appropriate fractions are combined and are further treated to isolate the individual products, suitably by crystallization.

The free acids and salts of the products of the invention can be obtained from the esters or amides by selective hydrolysis in a conventional manner, or from suitable esters by catalytic hydrogenolysis.

The foregoing procedure produces all of the compounds of the invention with the exception of the $\Delta^2$-cephem compounds represented by Formulas I-D and I-G. When the reaction is carried out with an acid anhydride upon the penicillin sulfoxide in the form of an ester or amide, compounds I-A, I-B, and I-C are produced in a total yield of around 60 percent or somewhat higher. Generally speaking, when the penicillin sulfoxide is treated in the form of an ester or an amide, the ester or amide moiety tends to be retained in the product, while when the penicillin sulfoxide is treated in the form of the free acid or a salt, the products tend to be of the decarboxylated class. When strong acids are employed, such as the sulfonic acids, only those products having the thiazine ring are produced.

The 2-acyloxymethyl penicillins of Formula II, in particular the 2-acetoxy compounds, are readily convertible into cephalosporins of the prior-art class, or closely similar thereto, by repetition of the process of the present invention, proceeding once more through the sulfoxide and directly to the cephalosporin by acid treatment at elevated temperature.

The $\Delta^2$-cephem compounds of the present invention are readily prepared from the corresponding $\Delta^3$-cephem compounds by exposing the latter to alkaline conditions, suitably at ordinary or reduced temperatures. The treatment can be carried out, for example, in the presence of a nitrogen base such as pyridine and/or a strong inorganic base such as sodium hydroxide. The double bond is caused thereby to migrate, and the product is readily recovered by conventional means. The same procedures are applicable to the conversion of the cephalosporins of the prior art to the analogous $\Delta^2$-cephalosporins.

The mechanism by way of which the process of the present invention accomplishes the desired results has not been established with certainty, but may involve the following steps.

In the first step, wherein the penicillin sulfoxide is subjected to heat treatment under acid conditions, the acidic material may be formulated generally as "QZ," where Q is an electrophile and Z is a nucleophile. It is reasonable to postulate that the acidic reagent attacks the sulfoxide oxygen to produce a reactive intermediate,

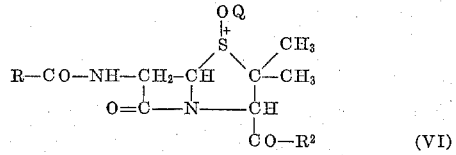

(VI)

The intermediate then undergoes rupture of the bond between the sulfur and the $C^2$ atom, with concomitant loss of a proton on one of the $C^2$ methyl groups, presumably the one cis to the sulfoxide oxygen, yielding a sulfenic acid intermediate,

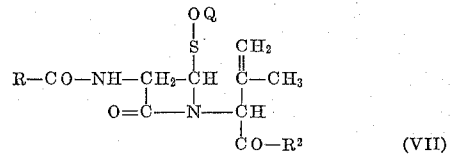

(VII)

In the latter, the sulfenic acid moiety can add internally to the double bond in two ways, both of which give rise to intermediates with electron-deficient centers. In one mode of addition, the sulfur atom adds to the methylene group, splitting off —OQ, and giving a thiazine compound

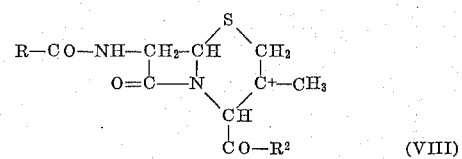

(VIII)

In the other mechanism, the sulfur atom adds to the original $C^2$ atom, splitting off —OQ and yielding a thiazolidine compound:

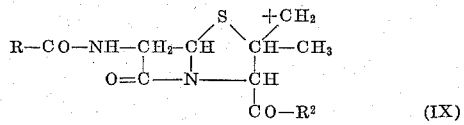

(IX)

In the case of either intermediate, VIII or IX, the electron deficiency can be satisfied by the addition of a nucleophile Y to give products IV and II, respectively. The nucleophile Y can be either an anion $Z^-$ formed in the first stage of the reaction or —OQ liberated in the succeeding step, and may, for instance, be the conjugate base of the solvent (e.g., acetoxy from acetic anhydride). Thus, the substituent introduced thereby can be ether, ester, hydroxyl, halide, or acyloxy, depending upon the reagent or solvent used. The overall rearrangement of VII to IV and II is stereospecific in that only one isomer of IV and II are formed in the reaction. This suggests that the reaction takes place by way of a cyclic sulfonium intermediate, with addition of the nucleophile Y in a position trans to the sulfur atom.

A second method of satisfying the electron-deficient center in intermediate VIII is the loss of a proton, giving rise to an olefin, predominantly product I-C. Two other olefins, isomeric with I-C can also be formed:

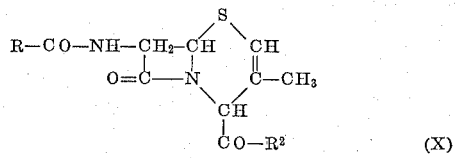

(X)

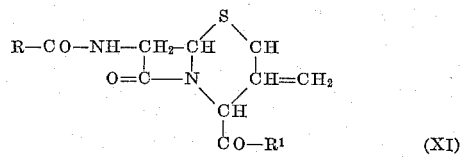

(XI)

In the penicillin starting material the side chain R can be any organic radical, so long as it is sufficiently stable under the reaction conditions to permit the desired conversion to go forward. The prior art discloses many hundreds of such side chains, as will be seen by reference to such publications as Behrens et al. U.S. Patents 2,479,295–7 (August 16, 1949), Doyle U.S. Patent 2,951,-839 (September 6, 1960), Abildgaard Belgian Patent 593,-295, and numerous others. The processing methods of the invention are concerned with modification of the thiazolidine ring structure of the starting material; and so far as can be ascertained, the nature of the substituent in the 6-position of the molecule has essentially no bearing upon the desired result. The side chain R can accordingly be alkyl, alkoxyalkyl, alkylmercaptoalkyl, cycloalkyl, cycloalkoxyalkyl, cycloalkylmercaptoalkyl, aryl, aryloxyalkyl, arylmercaptoalkyl, aralkyl, heterocyclic, heterocyclicalkyl, and the like, with or without substituents such as halo, alkyl, nitro, acyl, trifluoromethyl, alkoxy, alkylmercapto, phenylmercapto, and the like. The choice of starting material will generally be dictated by the structure of the desired product; but in general it can be said that the greater the stability of the starting material to acid, the higher the yield of product obtained in accordance with the invention.

Illustrative penicillins include, but are not limited to, the following:

benzyl
phenoxymethyl
n-heptyl
2,6-dimethoxyphenyl
α-phenoxyethyl
1-phenoxyisopropyl
α-aminobenzyl The penicillins can be employed in the form of the free acids; the sodium, potassium, amine, or other salts; the methyl, ethyl, n-butyl, or other esters; or the amide, the N-methylamide, the N,N-diethylamide, or other amides, the choice depending to some extent upon the desired end product, since the course of the reaction is influenced by the structure of the penicillin at the carboxyl group, as pointed out above. The penicillin may be converted to the desired form before or after conversion to the sulfoxide, as desired.

In the new compounds provided by the present invention, the β-lactam has greater chemical and penicillinase stability than the compounds of the prior art. The acids and salts exhibit the ability in greater or lesser degree to destroy or inhibit the growth of many microorganisms, among which are the Staphylococci, the Streptococci, and the Bacilli. Numerous uses for the compounds will thus be apparent from the art; e.g., as topical sterilants. The esters and amides are useful as intermediates in the production of the acids and salts. Especially useful are the 2-acyloxymethyl penicillins represented by Formula II, which can be converted directly into cephalosporins by repetition of the process of the invention. The products of the invention are additionally useful as intermediates for the synthesis of still newer antibiotic substances, in particular certain derivatives of cephalosporin C. The unsaturated compounds can be reacted, for example, with oxidizing agents, carboxylating agents, halogenating agents, and other substances to produce derivatives of modified or enhanced effectiveness. They can be hydrogenated in the presence of palladium catalysts to produce the saturated compounds. Modified cephalosporins can be obtained by oxidizing cephem compounds by known techniques for oxidizing allylic carbon atoms, employing, for example, N-bromosuccinimide, lead tetraacetate, or selenium dioxide.

The structures of the compounds of the present invention have been proved by way of their infrared, ultraviolet, and nuclear magnetic resonance spectra. The materials show a hydroxylamine test typical of penicillins, and the mobility of the acids on paper electrophoresis is similar to the corresponding penicillins. They are conveniently analyzed by the method of Ford, Analytical Chemistry, 19, 1004 (1947), which is based upon the quantitative determination of the β-lactam moiety of the molecule via reaction with hydroxylamine. Their antibiotic potencies are readily determined against a standard organism such as Staphylococcus aureus 209 P by appropriate modifications of the paper disc plate methods of Higgens et al., Antibiotics & Chemotherapy, 3, 50–54 (1953) and Loo et al., Journal of Bacteriology, 50, 701–709 (1945).

The antibiotic activity of certain compounds of the present invention was determined according to the following procedure. Samples of the compounds were individually incubated at pH 7 in phosphate buffer for 20 hours at 37° C. with shaking. At the end of the incubation period, the solutions were subjected to assay against various microorganisms by the conventional paper disc plate method. The incubated solutions were also tested by paper electrophoresis followed by bioautographic assay. The compounds were the following:

2-methyl-2-acetoxymethyl-3-carbomethoxy-6-phenoxyacetamidopenam (A)
3-methyl-3-acetoxy-4-carbomethoxy-7-phenoxyacetamidocepham (B)
3-methyl-4-carbomethoxy-7-phenoxyacetamido-$\Delta^3$-cephem (C)

Compounds A and B were active against *Staphylococcus aureus* and *Bacillus subtilis*, but not against Gram-negative organisms. Compound B produced a zone size approximately half as great as that produced by compound A at the same concentration. On paper electrophoresis of compounds A and B, acid antibiotics were seen which had the same mobility as penicillin V. The zone size produced by compound A on electrophoresis was comparable to the product produced by penicillin V methyl ester when similarly treated. Compound C, when assayed under the described conditions, showed no antibiotic activity. When subjected to incubation at pH 9 phosphate buffer, however, compound C showed antibacterial activity against *S. aureus* and *B. subtilis* which was not affected by penicillin β-lactamase.

The invention will be more fully understood from the following operating examples:

*Example 1*

*Penicillin V sulfoxide.*—Sodium metaperiodate (8.0 g.) was added in one portion with stirring to a solution of 15.5 g. of penicillin V potassium salt in 300 ml. of water at room temperature, and stirring was continued while occasional starch-iodide tests for active oxygen were made. After 45 minutes the test became negative. The mixture was then diluted with 100 ml. of water and acidified to pH 2.3 with dilute hydrochloric acid. Penicillin V sulfoxide was precipitated thereby as the free acid, and was collected and recrystallized from aqueous methanol (1:2). The product weighed 12.3 g. and melted at 163–164° C. with decomposition.

*Penicillin V sulfoxide methyl ester.*—Three grams of penicillin V sulfoxide in the form of the free acid were suspended in 30 ml. of ethyl acetate. The suspension was stirred at room temperature, and to it was added a dilute solution of diazomethane in ethyl ether until the yellow color persisted. The mixture was then evaporated to dryness at reduced pressure and the residue was recrystallized from aqueous methanol. The product, weighing 2.5 g., was the methyl ester of penicillin V sulfoxide, melting at 120–122° C. Further recrystallization yielded an analytical sample melting at 121.5–122.5° C., $[\alpha]_D = +200.0$.

*Analysis.*—Calc. for $C_{17}H_{20}N_2O_6S$: C, 53.67; H, 5.29; N, 7.36. Found: C, 53.79; H, 5.32; N, 7.44.

*Acetoxymethylpenam and acetoxycepham derivatives.*—A solution of 500 mg. of penicillin V sulfoxide methyl ester in 35 ml. of acetic anhydride was heated at reflux for one-half hour and then evaporated to dryness at reduced pressure. The oily residue obtained thereby was taken up in ethyl acetate and the solution was washed successively with cold dilute aqueous sodium bicarbonate solution, water, and saturated aqueous sodium chloride solution. The washed solution was dried over sodium sulfate and evaporated to dryness at reduced pressure. The amorphous product (530 mg.) obtained thereby was chromatographed through a silicic acid column, using a mixture of cyclohexane and methyl isopropyl ketone (4:1) saturated with water as the eluting solvent. The eluate was collected in 7-ml. fractions at 20-minute intervals, which were analyzed by thin-layer chromatography and suitably combined for product isolation.

Fractions 75–88, 195 mg., constituted the penam derivative, 2-methyl-2-acetoxymethyl - 3 - carbomethoxy-6-phenoxyacetamidopenam. This material was rechromatographed for analysis. The purified product was an amorphous solid weighing 170 mg.

*Analysis.*—Calcd. for $C_{19}H_{22}O_7SN_2$: C, 54.01; H, 5.25; N, 6.63; S, 7.59; acetyl, 10.18; methoxyl, 7.35. Found: C, 53.55; H, 5.47; N, 6.26; S, 7.18; acetyl, 10.41; methoxyl, 6.93.

Fractions 110–115, 15 mg., were primarily the cepham derivative, 3-methyl-3-acetoxy-4-carbomethoxy - 7 - phenoxyacetamidocepham.

Fractions 89–105, 130 mg., were a mixture comprising principally the penam and cepham products. This material, on being subjected to rechromatography, yielded 50 mg. of the cepham compound. Both this material and the material from fractions 110–115 were amorphous, and contained a small proportion of 3-methyl-4-carbomethoxy-7-phenoxyacetamido-$\Delta^3$-cephem, as indicated by the nuclear magnetic resonance spectra.

*Example 2*

$\Delta^3$-*cephem derivative.*—A solution of 5.0 g. of penicillin V sulfoxide methyl ester and 160 mg. of p-toluenesulfonic acid in 60 ml. of xylene was heated at reflux for one hour and was then evaporated to dryness at reduced pressure. The residue was dissolved in ethyl acetate and the resulting solution was washed successively with dilute aqueous sodium bicarbonate solution, water, and saturated aqueous sodium chloride solution, then dried and evaporated at reduced pressure, yielding 4.5 g. of a dark-colored oil. The oil was chromatographed through 80 g. of silicic acid in a column with a mixture of chloroform and benzene (1:1) as the eluting solvent, the eluate being withdrawn in 7-ml. fractions. Fractions 115–225, 1.23 g., were combined and evaporated to dryness at reduced pressure, and the residue was crystallized from methanol-ether. The product weighed 306 mg. and melted at 137–138° C. A second crop of crystals weighed 174 mg. and melted at 128–136° C. Recrystallization yielded an analytical sample melting at 141–142° C.

*Analysis.*—Calc. for 3-methyl-4-carbomethoxy-7-phenoxyacetamido-$\Delta^3$-cephem, $C_{17}H_{18}N_2O_5S$: C, 56.34; H, 5.00; N, 7.73; S, 8.85. Found: C, 56.26; H, 5.08; N, 7.54; S, 8.93.

*Example 3*

$\Delta^3$-*cephem derivative, alternative preparation.*—7-phenoxyacetamidocephalosporanic acid methyl ester (549 mg.) in dioxane (45 ml.) was contacted with hydrogen at room temperature and 1200 p.s.i. in the presence of 2.0 g. of 10 percent palladium-on-charcoal. The treated solution was filtered and evaporated to dryness at reduced pressure. The residue was subjected to chromatographic separation on 10 g. of silica gel (E. Merck), using 5 percent ethyl acetate in chloroform as the elution solvent.

Fractions 5 and 6, 97 mg., were a mixture of starting material and 3-methyl-4-carbomethoxy-7-phenoxyacetamido-$\Delta^3$-cephem. This material was rechromatographed using 2 percent ethyl ether in chloroform as the elution solvent, and 11 mg. of the $\Delta^3$-cephem compound were obtained which was identical in every way (infra-red, ultraviolet, melting point, mixed melting point, X-ray diffraction) to that prepared by the sulfoxide rearrangement of Example 2.

Fractions 7–9, 275 mg., of the original chromatogram contained pure starting ester.

Fractions 10 et seq. yielded the dihydro derivative of the starting ester, as indicated by infrared, ultraviolet, and nuclear magnetic resonance spectra.

*Example 4*

$\Delta^2$-*cephem derivative.*—3-methyl-4 - carbomethoxy - 7-phenoxyacetamido-$\Delta^3$-cephem (276 mg.) was dissolved in aqueous 40 percent pyridine (25 ml.) and the solution was cooled in an ice bath. To it was added aqueous N/10 sodium hydroxide solution (7.6 ml.) in one portion and the mixture was stirred in the cold for 3 hours, then evaporated to dryness at reduced pressure. The residue was dissolved in water, layered with ethyl acetate, and acidified quickly in the cold to pH 2.0 with dilute hydrochloric acid, after which the layers were separated. The organic phase was washed with water, dried with sodium chloride, and evaporated to dryness at reduced pressure. The crude crystalline product obtained thereby weighed 306 mg. It was recrystallized twice from chloroform-petroleum ether, yielding 83 mg. of 3-methyl-7-phenoxyacetamido-$\Delta^2$-cephem-4 - carboxylic acid melting at 172–173.5 with decomposition.

*Example 5*

*3-methyl-7-phenoxyacetamido-$\Delta^3$-cephem.*—Penicillin V sulfoxide in the form of 10.0 g. of the free acid was heated in 100 ml. of sym.-tetrachloroethane at reflux temperature for 5 minutes, after which the solvent was removed by distillation at reduced pressure. The residue was dissolved in ethyl acetate, layered with water, and adjusted to pH 7 with dilute aqueous sodium hydroxide solution, and the layers separated. The ethyl acetate phase was washed with water, dried, and evaporated to dryness at reduced pressure. The resulting neutral residue was recrystallized from a mixture of chloroform and petroleum ether, yielding 800 mg. of 3-methyl-7-phenoxyacetamido-$\Delta^3$-cephem. Further recrystallization yielded an analytical sample melting at 173.5–174.5° C. with $$[\alpha]_D = -35.3°$$

*Analysis.*—Calc. for $C_{15}H_{16}O_3N_2S$: C, 59.19; H, 5.29; N, 9.20; S, 10.53. Found: C, 59.43; H, 5.44; N, 9.20; S, 10.70.

*Example 6*

*Penicillin V sulfoxide benzhydryl ester.*—Penicillin V sulfoxide in the form of 15.0 g. of the free acid was suspended in 200 ml. of ethyl acetate, and to the stirred suspension was added an excess of diphenyldiazomethane (Organic Syntheses, collective volume 3, page 351) in ether at room temperature. At the end of 20 minutes, a clear red solution had been obtained. The solution was allowed to stand overnight at room temperature and was then evaporated at reduced pressure. The residual material, a red gum, was crystallized from acetone and petroleum ether. The product, penicillin V sulfoxide benzhydryl ester, weighed 17.4 g. and melted at 155–156° C., $[\alpha]_D = +191.3°$.

*Analysis.*—Calc. for $C_{29}H_{28}N_2O_6S$: C, 65.39; H, 5.30; N, 5.26. Found: C, 65.61; H, 5.29; N, 4.92.

$\Delta^3$-*cephem benzhydryl ester.*—Penicillin V sulfoxide benzhydryl ester (5.0 g.) and dry p-toluenesulfonic acid (140 mg.) were suspended in 100 ml. of xylene and refluxed for 30 minutes. The resulting solution was evaporated to dryness at reduced pressure. The residue was dissolved in ethyl acetate and washed successively with dilute aqueous sodium bicarbonate solution, water, and saturated aqueous sodium chloride solution, and the washed solution was evaporated to dryness at reduced pressure, yielding 4.7 g. of crude product. Chromatography of this material through a silicic acid column with cyclohexane-methyl isobutyl ketone (4:1) as the eluting solvent yielded 422 mg. of the desired product, 3-methyl-4 - carbobenzhydryloxy-7-phenoxyacetamido-$\Delta^3$ - cephem, melting at 156–157° C. after recrystallization from methanol and having $[\alpha]_D = +30.3°$.

*Analysis.*—Calc. for $C_{29}H_{26}N_2O_5S$: C, 67.68; H, 5.09; N, 5.44; S, 6.23. Found: C, 67.63; H, 5.20; N, 5.26; S, 6.30.

Example 7

*Acetoxymethylpenam and acetoxycepham benzhydryl esters.*—Penicillin V sulfoxide benzhydryl ester was reacted with acetic anhydride according to the procedure of Example 1. The product was a mixture of the benzhydryl esters of 2-methyl-2-acetoxy-methyl-6-phenoxyacetamidopenam-3-carboxylic acid and 3-methyl-3-acetoxy-7-phenoxyacetamidocepham-4-carboxylic acid.

Example 8

3 - methyl - 7 - phenoxyacetamido - $\Delta^3$ - cephem - 4-carboxylic acid.—3-methyl-4-carbobenzhydryloxy-7-phenoxyacetamido-$\Delta^3$-cephem (100 mg.) was dissolved in 6 ml. of dioxane containing a trace of dry hydrogen chloride, and to the solution was added a suspension of 200 mg. of prereduced 10 percent palladium-on-charcoal in dioxane. The mixture was agitated with hydrogen at room temperature and atmospheric pressure, and a hydrogen uptake of 3.98 ml. (theoretical, 4.75 ml.) was observed over a period of 18 hours. The hydrogenation product was filtered and evaporated to dryness at reduced pressure. The residue thus obtained was dissolved in ethyl acetate, layered with water, and adjusted to pH 7 with dilute aqueous sodium hydroxide solution. The layers were separated. The ethyl acetate phase was washed with water, dried, and evaporated to dryness at reduced pressure. The neutral material thus obtained, weighing 50 mg., was identical to the benzhydryl starting ester. The aqueous phase and washings were combined, layered with ethyl acetate, and acidified to pH 2 with dilute hydrochloric acid. The ethyl acetate phase was separated, washed with water, dried, and evaporated to dryness at reduced pressure. The acidic material thus obtained, weighing 16 mg., was the free acid, 3-methyl-7-phenoxyacetamido-$\Delta^3$-cephem-4-carboxylic acid, having a $pK_a$ in 66 percent aqueous dimethylformamide of 5.7. The structure of the material was confirmed by its nuclear magnetic resonance spectrum. The potassium salt was prepared in crystalline form and was found to have an antibiotic assay against *Staphylococcus aureus* of 12 penicillin G units per milligram.

We claim:

1. A method for preparing antibiotic substances which comprises heating a penicillin sulfoxide under acid conditions at a temperature between about 100 and about 175° C. for a time sufficient to effect substantial conversion thereof.

2. A method for preparing cephalosporin compounds which comprises heating a penicillin sulfoxide in the presence of a strong acid at a temperature between about 100 and about 175° C. for a time sufficient to effect substantial conversion thereof.

3. A method for preparing decarboxycephalosporin compounds which comprises heating a penicillin compound of the class consisting of penicillin sulfoxide free acid and penicillin sulfoxide salts at a temperature between about 100 and about 175° C. for a period of about 5 minutes to about 1 hour.

4. A method for converting the thiazolidine ring of a penicillin into the thiazine ring of the cephalosporins which comprises heating a penicillin sulfoxide ester in an inert liquid and in the presence of a strong acid at a temperature between about 125 and about 150° C. for a time sufficient to cause substantial conversion thereof, and recovering the resulting cephalosporin compound.

5. A method for decarboxylating a penicillin and converting the thiazolidine ring thereof into the thiazine ring of the cephalosporins which comprises heating a penicillin compound of the class consisting of penicillin sulfoxide free acid and the salts thereof in the presence of an inert organic liquid and a strong acid at a temperature between about 100 and about 175° C. for a time sufficient to cause substantial conversion thereof and recovering the resulting cephalosporin compound.

6. A method for producing a cephalosporin from a penicillin having an acetoxy group substituted on a methyl in the 2-position, which comprises heating the sulfoxide of said penicillin in the presence of an excess of acetic anhydride at a temperature between about 125 and about 150° C. for a period of about 5 minutes to about 1 hour, and recovering the resulting cephalosporin.

7. A method for converting a $\Delta^3$-cephem compound into a $\Delta^2$-cephem compound which comprises subjecting said $\Delta^3$-cephem compound to exposure to basic conditions for a time and under temperature conditions sufficient to effect said conversion.

8. A method for converting a $\Delta^3$-cephem compound into a $\Delta^2$-cephem compound which comprises subjecting said $\Delta^3$-cephem compound to exposure to a nitrogen base for a time and under temperature conditions sufficient to effect said conversion.

References Cited by the Examiner

UNITED STATES PATENTS

| | | | |
|---|---|---|---|
| 3,124,576 | 3/1964 | Stedman | 260—243 |
| 3,131,184 | 4/1964 | Chow et al. | 260—243 |
| 3,193,550 | 7/1965 | Harris | 260—243 |

OTHER REFERENCES

Morton, The Chemistry of Heterocyclic Compounds, page vi of the preface, 1946.

Journ. Amer. Medical Assn., page 466, May 24, 1958.

ALEX MAZEL, *Primary Examiner.*

NICHOLAS S. RIZZO, IRVING MARCUS, HENRY R. JILES, *Examiners.*

J. W. ADAMS, *Assistant Examiner.*